United States Patent
Takasima

(10) Patent No.: US 7,206,262 B2
(45) Date of Patent: Apr. 17, 2007

(54) OPTICAL DISK RECORDING/REPRODUCING DEVICE

(75) Inventor: Makoto Takasima, Ikoma (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 526 days.

(21) Appl. No.: 10/487,981

(22) PCT Filed: Jan. 7, 2003

(86) PCT No.: PCT/JP03/00033

§ 371 (c)(1),
(2), (4) Date: Feb. 27, 2004

(87) PCT Pub. No.: WO03/060902

PCT Pub. Date: Jul. 24, 2003

(65) Prior Publication Data
US 2004/0233796 A1 Nov. 25, 2004

(30) Foreign Application Priority Data
Jan. 10, 2002 (JP) ............... 2002-003080

(51) Int. Cl.
G11B 7/00 (2006.01)
G11B 11/00 (2006.01)

(52) U.S. Cl. ............... 369/44.26; 369/44.34; 369/13.02

(58) Field of Classification Search ............ 369/44.26, 369/44.34, 44.41, 44.29, 44.35, 53.31, 274.4, 369/44.28, 53.27, 13.02, 13.03, 13.05, 13.14, 369/13.27, 13.32, 13.22
See application file for complete search history.

(56) References Cited

U.S. PATENT DOCUMENTS

| 6,469,960 B1 | 10/2002 | Miyoshi |
| 6,778,473 B1 * | 8/2004 | Tomita et al. ............ 369/44.26 |

FOREIGN PATENT DOCUMENTS

| JP | 62-189655 | 8/1987 |
| JP | 3-150742 | 6/1991 |
| JP | 4-205940 | 7/1992 |
| JP | 6-20329 | 1/1994 |
| JP | 2002-319205 | 10/2002 |
| JP | 2002-373460 | 12/2002 |

* cited by examiner

Primary Examiner—Ali Neyzari
(74) Attorney, Agent, or Firm—Hamre, Schumann, Mueller & Larson, P.C.

(57) ABSTRACT

A moved distance detecting means (15) detects the moved distance in a tracking direction of an object lens, a position signal generating means (60) generates a position signal corresponding to the position of the object lens based on the detection, and a drive signal modulating means (40) modulates the drive current of a magnetic head (20) according to this position signal. Therefore, a drive current can be controlled according to the moved distance of the object lens to enable the magnetic head to be driven with a small current when a moved distance is small and with a large current according to a moved distance only when it is large, whereby it is possible to reduce an average drive current and hence reduce power consumption as a whole.

6 Claims, 11 Drawing Sheets

Shift amount of an objective lens in a tracking direction (mm)

OPTICAL DISK RECORDING/REPRODUCING DEVICE

TECHNICAL FIELD

The present invention relates to an optical disk recording/reproducing device that performs optical information recording/reproduction.

BACKGROUND ART

It is said that today is the age of information, and high-density and large-capacity memories at the heart thereof have been developed enthusiastically. Memories are required to have not only the capability of high-density and large-capacity storage, but also the capability of achieving high reliability, rewriting capability and the like. Among recording media that satisfy these requirements, optical disk memories such as a magneto-optical disk and the like have received the most attention. The present invention relates to an optical disk recording/reproducing device that performs recording or reproduction with respect to such optical disk memories.

Conventionally, many technical reports have been made on optical disk recording/reproducing devices. The following description will be made with reference to the appended drawings by using a Mini Disc device as an example of optical disk recording/reproducing devices with the rewriting capability among various types of optical disk recording/reproducing devices.

FIG. 14A is a plan view schematically showing the appearance of an optical head and a magnetic head of an optical disk recording/reproducing device that performs recording/reproduction with respect to a recording medium that is a magneto-optical disk such as a Mini Disc or the like. FIG. 14B is a side view showing the appearance. The following description is directed to the configuration and operation with reference to these figures.

In FIGS. 14A and 14B, reference character 1 denotes a light receiving/emitting element that is configured as a single device mounting a semiconductor laser chip and an optical signal detecting part therein. The semiconductor laser chip is a light emitting part that emits laser light, and the optical signal detecting part receives reflected light from a recording medium 8 that originates in this laser light so as to detect various signals. Reference character 2 denotes a laser beam that is radiated from the light receiving/emitting element 1. Reference characters 3 and 4 denote a mirror that leads a laser beam from the light receiving/emitting element 1 to the recording medium 8, and an objective lens actuator that shifts an objective lens 5 in a tracking direction and a focusing direction so that the objective lens 5 follows the eccentricity and surface wobbling of the recording medium, respectively. Reference characters 4a, 4b, 4c and 4d denote a magnet that constitutes a movable part of the objective lens actuator 4, a coil for allowing a driving force to be generated in the magnet 4a, a fixed part of the objective lens actuator 4, and an actuator base for fixing the objective lens actuator 4 to an optical base 6, respectively. Further, reference characters 5 and 6 denote the objective lens that focuses the laser beam 2, which has been reflected off the mirror 3, onto the recording medium 8 so that a minute beam spot is formed, and the optical base for fixing the light receiving/emitting element 1 and the objective lens actuator 4, respectively. Reference character 7 denotes a magnetic head that, in the case where the recording medium 8 is of a recording type, applies a modulated magnetic field to the recording medium 8 so as to realize so-called magnetic field modulation recording. The magnetic head 7 is composed of a magnetic core 7a that is formed of a magnetic material, a coil 7b, a sliding part 7c that slides on the recording medium and keeps the magnetic core 7a at a given distance from a surface of the recording medium 8, and a supporting part (not shown). Reference character 8 denotes the recording medium. In FIG. 14A, an arrow X indicates the tracking direction of the recording medium 8 (namely, a radial direction of the disk-like recording medium 8).

In the optical disk recording/reproducing device having the above-mentioned configuration, when performing reproduction, the laser beam 2 is emitted from the light receiving/emitting element 1, and the objective lens actuator 4 is driven so that the objective lens 5 forms a minute beam spot in a predetermined position of the recording medium 8. A reflected light beam from the recording medium 8 returns to the light receiving/emitting element 1, so that a focus error signal, a tracking error signal, and a RF signal are detected. When performing recording, the light receiving/emitting element 1 emits an optical power having a given intensity so that the temperature of an information recording film is raised to a temperature not lower than the Curie point by a beam spot formed by focusing a light beam on the recording medium 8. Further, a modulated current having a waveform shown in FIG. 16 is applied to the magnetic head 7 that is provided on a side opposite to a light beam incidence side with respect to the recording medium 8. This allows the recording film, which has been heated to a temperature not lower than the Curie point, to be magnetized perpendicularly, so that so-called magnetic field modulation recording is performed.

The coil 7b of the magnetic head 7 is supplied with an electric current represented by FIG. 16, and thus magnetic flux is emitted from an end of the magnetic core 7a. A distribution of a magnetic field intensity obtained in this case is shown in FIG. 15. FIG. 15 shows the results obtained by determining a magnetic field intensity in the vicinity of a beam spot. In the figure, the horizontal axis indicates a distance D in a radial direction from a central position of the magnetic core 7a, and the vertical axis indicates a magnetic field intensity expressed as a unitless value relative to the magnetic field intensity required for recording.

In FIG. 15, in an area defined by a distance of ±0.5 mm in the radial direction from the central position of the magnetic core 7a, a constant magnetic field intensity is obtained. A width defined by this area substantially equals a width (1 mm) of the magnetic head 7 in the radial direction. In a region defined by an absolute value of the distance D in the radial direction from the central position of the magnetic core 7a higher than 0.5 mm, the magnetic field intensity decreases with increasing distance. The magnetic field intensity required for recording changes depending on a distance between a beam spot and the magnetic head (a thickness of a protective layer on the recording medium, an assembly error, an orientation of the magnetic head, or the like) and by a shift of the objective lens in the tracking direction.

In the above-mentioned configuration according to the conventional technique, the driving current for the magnetic head 7 is set so as to allow recording to be performed under any assumed condition. That is, the current value of a driving current to be supplied to the coil 7b was set so that a magnetic field intensity that enables recording was obtained by giving consideration to a distance between a beam spot and an end of the magnetic core and a maximum distance the objective lens is shifted in the radial direction from the central position of the magnetic core.

In this example, the recording medium 8 is set so as to have a maximum amount of eccentricity of 0.6 mm. In order to allow a beam spot to follow a recording track of the recording medium 8 having such an amount of eccentricity, the objective lens 5 is shifted a distance in a range of ±0.6 mm in the radial direction with respect to the magnetic core 7. Therefore, it is necessary that a magnetic field intensity required for recording should be obtained in an area defined by a distance of ±0.6 mm in the radial direction from the central position of the magnetic core 7a ("effective magnetic field region" shown in FIG. 15). To this end, an electric current having a higher current value was applied to the coil 7b so that a magnetic field intensity of not lower than 1 was obtained in the area defined by the distance of ±0.6 mm for the distance D in the radial direction as shown by a dotted line in FIG. 15. Accordingly, in an area defined by a distance of ±0.5 mm for the distance D in the radial direction from the central position of the magnetic core, a magnetic field intensity of 1.25 is obtained. This indicates that when a beam spot is positioned within this area, an electric current having a current value higher than necessary is applied. As a result of this, power consumption is increased, and thus in portable equipment, the continuous operation time is shortened, which has been disadvantageous.

Meanwhile, in the case where the magnetic core has a width in the radial direction that is increased so as to correspond to a shift amount of the objective lens 5 in the radial direction (±0.6 mm in the above-mentioned example), the inductance of the coil increases. Recent years have seen a trend in which recording is performed at a higher transfer rate and thus requires a higher recording frequency. Despite such a trend, with the inductance increased, a higher recording frequency cannot be attained, which has been disadvantageous.

DISCLOSURE OF THE INVENTION

It is an object of the present invention to provide an optical disk recording/reproducing device that allows an average driving current for a magnetic head to be reduced, and uses a magnetic head having a decreased inductance, thus exhibiting an excellent high-frequency property.

In order to achieve the above-mentioned object, an optical disk recording/reproducing device according to the present invention includes a magnetic head that performs magnetic field modulation, an objective lens for focusing light on a recording medium, an objective lens actuator that allows the objective lens to perform a following operation in a focusing direction and a tracking direction, a shift amount detecting unit that detects a shift amount of the objective lens in the tracking direction, a position signal generating unit that generates a position signal corresponding to a position of the objective lens based on an output signal from the shift amount detecting unit, and a driving signal modulating unit that modulates a driving current for the magnetic head so as to correspond to the position signal.

BEST MODE FOR CARRYING OUT THE INVENTION

In the optical disk recording/reproducing device according to the present invention, the shift amount detecting unit detects a shift amount of the objective lens in the tracking direction. Based on the shift amount, a position signal corresponding to a position of the objective lens is generated. The driving signal modulating unit modulates a driving current for the magnetic head so as to correspond to the position signal.

Accordingly, the driving current can be controlled so as to correspond to a shift amount of an objective lens, and thus a magnetic head can be driven in the following manner. That is, when the shift amount is small, the magnetic head is driven with a small electric current, and only when the shift amount is large, the magnetic head is driven with an electric current large enough to correspond to the shift amount. Thus, an average driving current can be reduced, thereby allowing a reduction in power consumption as a whole to be achieved.

Preferably, the driving signal modulating unit modulates a driving current for the magnetic head in a stepwise manner. Accordingly, the configuration of a modulating circuit can be simplified.

The shift amount detecting unit may detect the shift amount of the objective lens in the tracking direction by detecting a relative displacement between a movable part and a fixed part of the objective lens actuator. Accordingly, the amount of a relative shift between the magnetic head and the objective lens can be detected easily, thereby allowing a driving current for the magnetic head to be controlled.

Alternatively, the shift amount detecting unit may detect the shift amount of the objective lens in the tracking direction based on reflected light from the recording medium. Accordingly, the shift amount detecting unit can be configured without increasing the number of components.

Preferably, a magnetic core of the magnetic head has a dimension in the tracking direction that is smaller than a shift amount of the objective lens in the tracking direction. Accordingly, a magnetic core and a coil can be reduced in size, and thus the coil can be decreased in inductance. Thus, an excellent high-frequency property can be obtained, thereby allowing a higher transfer rate to be realized.

Preferably, an absolute value of a driving current for the magnetic head has a set upper limit value. Accordingly, damage to the magnetic head due to burning or the like during an abnormal operation can be prevented.

Hereinafter, the present invention will be described in detail by way of embodiments.

(Embodiment 1)

Figure 1:
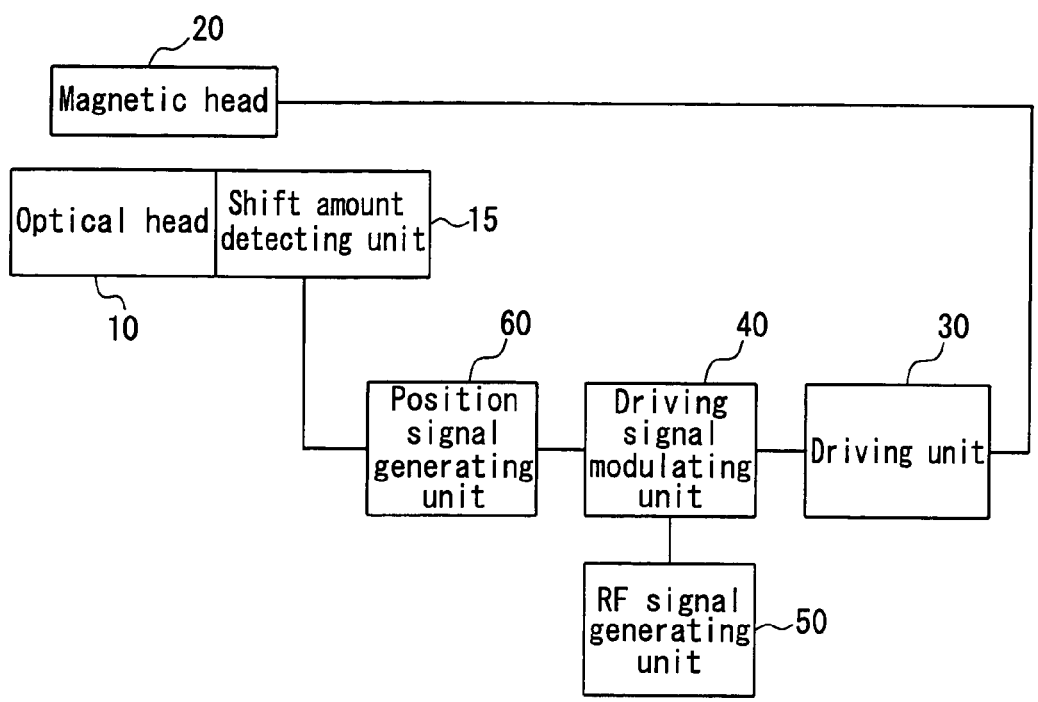
FIG. 1 is a block diagram schematically showing a configuration of an optical disk recording/reproducing device according to Embodiment 1 of the present invention.
Figure 2:
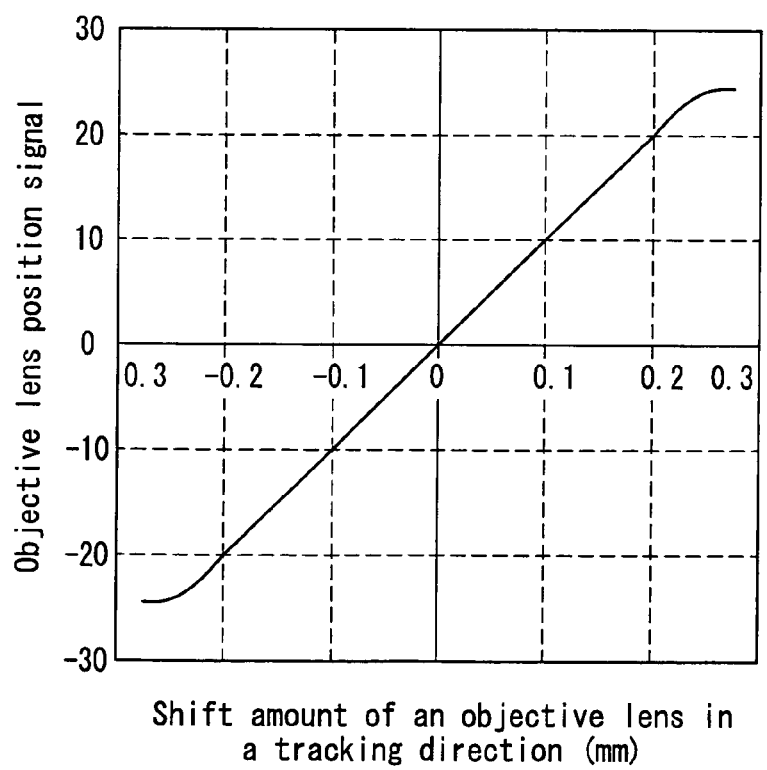
FIG. 2 is a diagram showing a relationship between a shift amount of an objective lens in a tracking direction and an objective lens position signal in the optical disk recording/reproducing device according to Embodiment 1 of the present invention.
Figure 3:
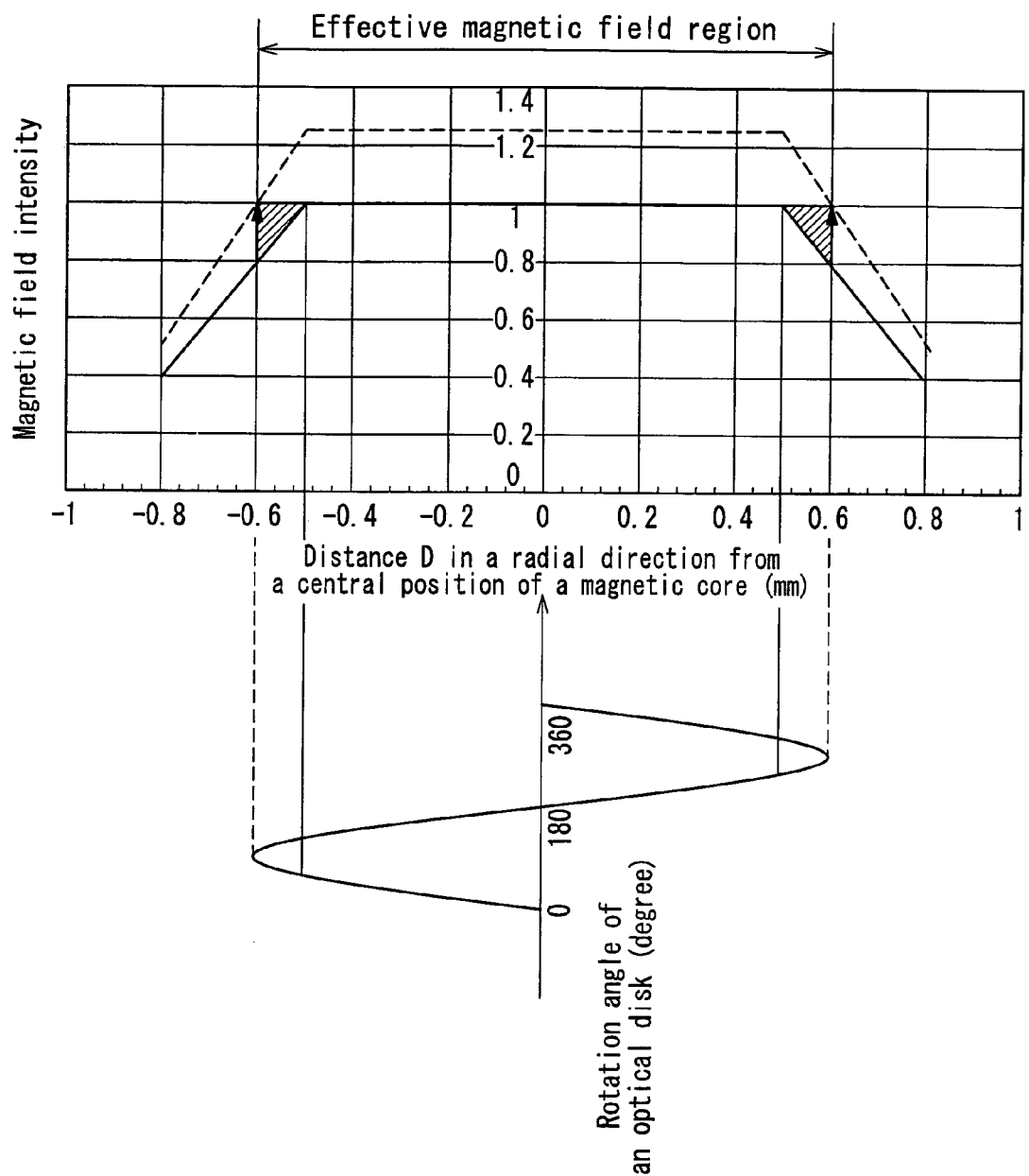
FIG. 3 is a diagram showing the distribution of an intensity of a magnetic field generated by a magnetic head in the optical disk recording/reproducing device according to Embodiment 1 of the present invention.
Figure 4:
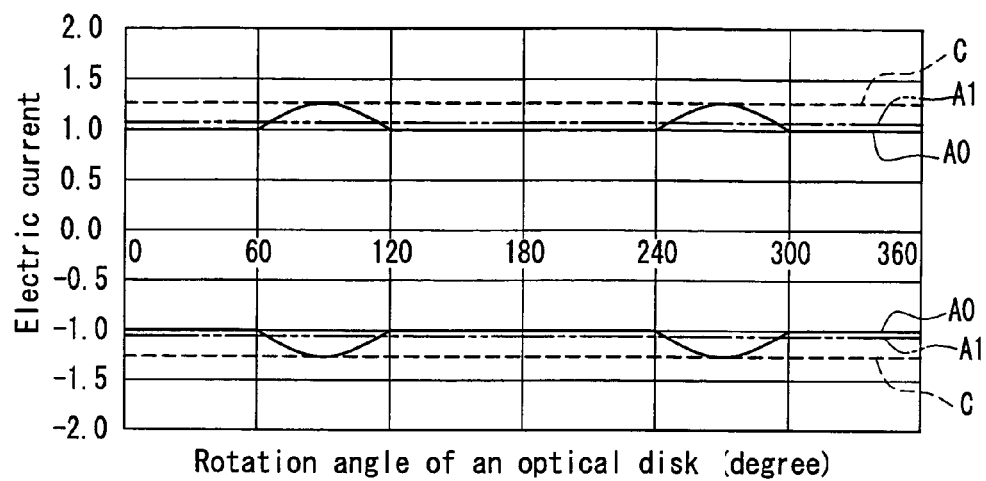
FIG. 4 is a diagram showing an example of a peak waveform of a driving current for the magnetic head in the optical disk recording/reproducing device according to Embodiment 1 of the present invention.
Figure 5:
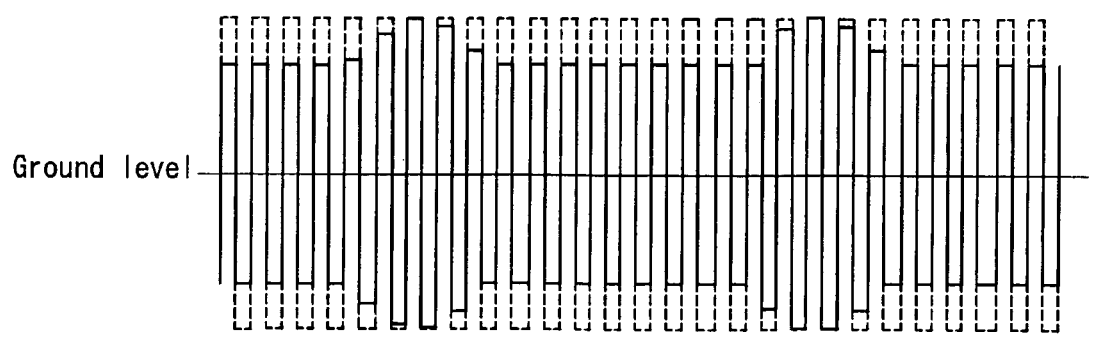
FIG. 5 is a diagram showing an example of a pulse waveform of a driving current for the magnetic head in the optical disk recording/reproducing device according to Embodiment 1 of the present invention.

The following description is directed to an optical disk recording/reproducing device according to Embodiment 1 of the present invention with reference to FIGS. 1 to 6. FIG. 1 is a block diagram for explaining the optical disk recording/reproducing device according to this embodiment. FIG. 2 is a diagram showing a relationship between a shift amount of an objective lens in a tracking direction (radial direction) and an objective lens position signal in the optical disk recording/reproducing device according to this embodiment. FIG. 3 is a diagram showing the distribution of a magnetic field intensity in the radial direction. FIG. 4 is a diagram showing the driving current peak waveform in the optical disk recording/reproducing device according to this embodiment. FIG. 5 is a diagram showing a driving current pulse waveform.

As shown in FIG. 1, an objective lens actuator of an optical head 10 shifts the objective lens in the tracking direction so that the objective lens follows disk eccentricity or the like. A shift amount detecting unit 15 outputs a signal corresponding to a shift amount of the objective lens in the tracking direction. Based on this signal, a position signal generating unit 60 generates an objective lens position signal that is in proportion to a shift amount of the objective lens in the tracking direction, which is shown in FIG. 2. Next, using this objective lens position signal, a driving signal modulating unit 40 at a next stage generates a modulation signal corresponding to the shift amount of the objective lens, and outputs a driving signal by performing a computation on the modulation signal using a signal generated by a RF signal generating unit 50. A driving unit 30 at a final stage amplifies the driving signal to drive a magnetic head 20.

The following description is directed to an operation in the driving signal modulating unit 40. The driving signal modulating unit 40 generates a modulation signal based on the objective lens position signal and a distribution of a magnetic field intensity of the magnetic head.

This process will be described herein by referring to FIGS. 3 and 4. In FIG. 3, the horizontal axis indicates a distance D in the radial direction from a central position of a magnetic core, and the vertical axis indicates a magnetic field intensity expressed as a unitless value relative to the magnetic field intensity required for recording.

Figure 15:
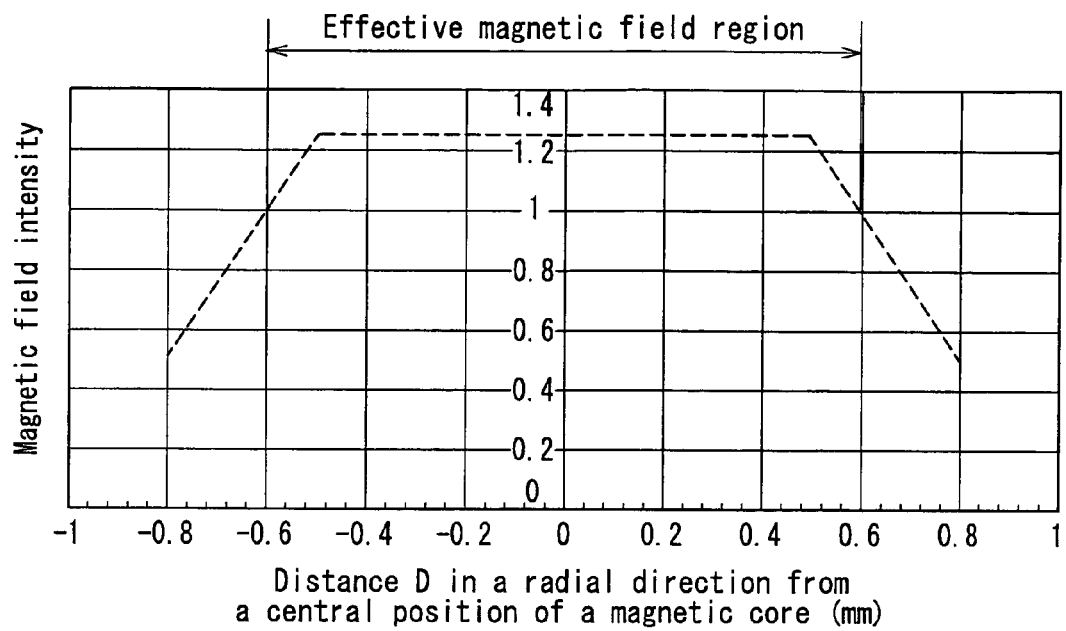
FIG. 15 is a diagram showing the distribution of an intensity of a magnetic field generated by the magnetic head in the conventional optical disk recording/reproducing device.
Figure 16:
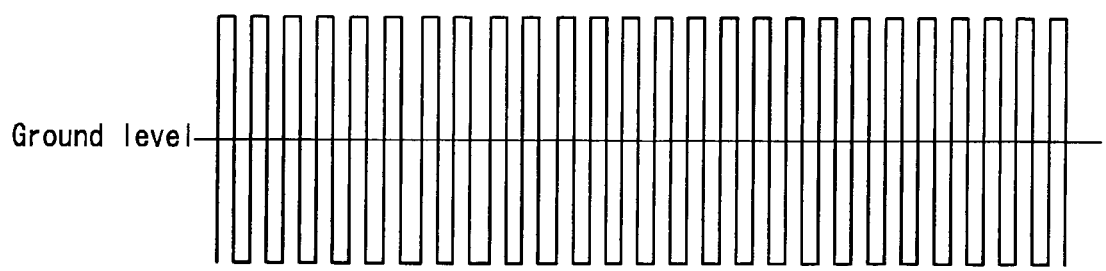
FIG. 16 is a diagram showing a pulse waveform of a driving current for the magnetic head in the conventional optical disk recording/reproducing device.

In the figure, the dotted line shows the distribution of a magnetic field intensity of a magnetic head according to the conventional technique as an example, which is the same as that shown in FIG. 15. In an area defined by a distance of ±0.5 mm for the distance D in the radial direction from the central position of the magnetic core, substantially a constant magnetic field intensity is obtained. When the absolute value of the distance D becomes larger than 0.5 mm, the magnetic field intensity decreases. In this conventional example, with an amount of disk eccentricity taken into consideration, an effective magnetic field region is set to be an area defined by a distance of ±0.6 mm in the radial direction from the central position of the magnetic core. When tracking control is performed with respect to the objective lens, a position of a beam spot moves within this effective magnetic field region. In order to allow recording to be performed even in such a case, an electric current is applied to a coil so that a magnetic filed intensity of not lower than 1 always can be obtained within this effective magnetic field region. As a result, in the area defined by the distance of ±0.5 mm for the distance D in the radial direction from the central position of the magnetic core, a magnetic field intensity of 1.25 is obtained. This indicates that when a beam spot is positioned within this area, an electric current having a current value higher than necessary is applied.

In this embodiment, in order to achieve a reduction in a driving current, a driving current is used in an amount decreased by 20% with respect to that in the case of the conventional example. The magnetic field intensity is in proportion to a driving current applied to the coil. Therefore, when using an electric current having a current value 20% lower with respect to that in the case of the conventional example shown by the dotted line, the magnetic field intensity has a distribution shown by the solid line. In the area defined by the distance of ±0.5 mm for the distance D in the radial direction, a magnetic field intensity of 1 is obtained. When an absolute value of the distance D in the radial direction becomes higher than 0.5 mm, the magnetic field intensity decreases.

The diagram shown below in FIG. 3 shows a shift amount of the objective lens in the radial direction with respect to the central position of the magnetic core when an optical disk having an amount of eccentricity of 0.6 mm is followed by the objective lens. During the time that the shift amount of the objective lens in the radial direction with respect to the central position of the magnetic core has an absolute value higher than 0.5 mm, recording cannot be performed due to an insufficient magnetic field intensity.

Thus, in this embodiment, the following process is performed. That is, a shift amount of the objective lens in the radial direction is detected. When the shift amount has a value beyond a range of ±0.5 mm with respect to the central position of the magnetic core, the percentage decrease of a magnetic field intensity corresponding to the shift amount is determined based on the distribution of a magnetic field intensity shown by the solid line in FIG. 3. Then, an electric current modulated (amplified) by a reciprocal of this percentage decrease is applied to the coil. As a result, even when the objective lens is shifted a distance in a range of more than 0.5 mm and not more than 0.6 mm in the radial direction from the central position of the magnetic core, a magnetic field intensity of 1 always can be obtained, thereby allowing recording to be performed.

FIG. 4 shows a peak waveform of a driving current to be applied to the coil in the case where recording is performed with respect to an optical disk having an amount of disk eccentricity of 0.6 mm (0–peak). In the figure, the horizontal axis indicates a rotation angle of the optical disk, and the vertical axis indicates a current value. When using an electric current having a current value of "1", a magnetic field having a magnetic field intensity of "1" shown in FIG. 3 is applied. In FIG. 4, a solid line A0 shows a peak waveform (peak-to-peak value) of a driving current used in this embodiment. When the objective lens follows eccentricity of the optical disk and thus is displaced so as to have a shift amount in a range of ±0.5 mm, an electric current having a current value of 1 is used. However, when the shift amount has an absolute value higher than 0.5 mm, an electric current is used in an increased amount. When the shift amount reaches a value having an absolute value of 0.6 mm, an electric current having a current value of 1.25 is used. After the shift amount has reached the value having the absolute value of 0.6 mm, an electric current is used in an amount that decreases back to a current value of 1. For every one rotation of the optical disk, two current peaks occur.

This waveform is multiplied by a signal obtained by the RF signal generating unit 50, and thus an actual driving current pulse waveform shown by a solid line in FIG. 5 is obtained. In FIG. 5, a dotted line shows a driving current pulse waveform used in the case of the conventional example.

In FIG. 4, a chain double-dashed line A1 shows an average value of a driving current modulation waveform A0, and has a current value of 1.06. This value constitutes 85% of a current value of 1.25 of the driving current waveform used in the case of the conventional example, which is shown by a dotted line C. This indicates that this embodiment achieved a 15% reduction in a driving current.

In the case where an objective lens actuator 4 shifts in an amount more than a predetermined shift amount (±0.6 mm in this example), in order to prevent, for example, burning of the coil of the magnetic head, a limiting unit (not shown) is provided that limits driving of the coil when an electric current larger than an assumed largest current (with a current value having an absolute value of 1.25 shown in FIG. 4) is used.

Figure 6:
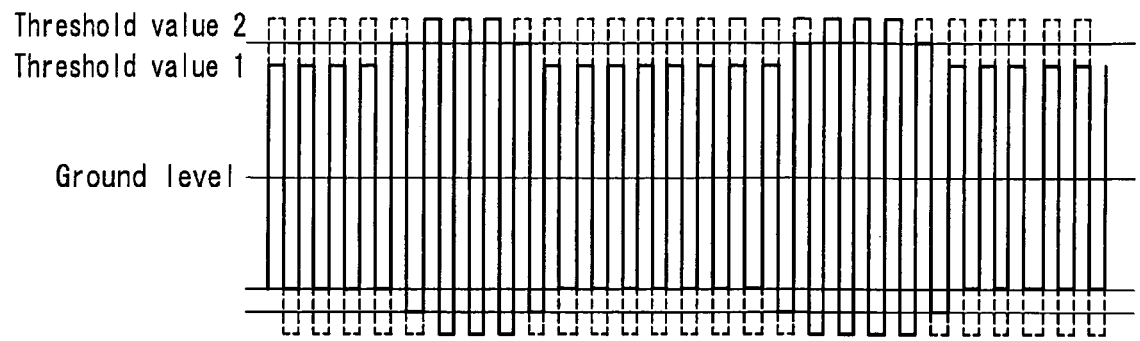
FIG. 6 is a diagram showing another example of the pulse waveform of a driving current for the magnetic head in the optical disk recording/reproducing device according to Embodiment 1 of the present invention.

Furthermore, in the above-mentioned embodiment, as a waveform used to modulate a driving current, a continuous waveform shown by the solid line A0 in FIG. 4 is used. However, a stepwise waveform also may be used. FIG. 6 shows another example of the modulated driving current pulse waveform in the optical disk recording/reproducing device according to this embodiment. In FIG. 6, a solid line shows a driving current pulse waveform according to this embodiment, which is modulated using a waveform having a 0–peak value varying in three steps. In FIG. 6, a dotted line shows a driving current pulse waveform used in the case of the conventional example.

As described above, according to this embodiment, when the shift amount of an objective lens 5 in the radial direction is small, an electric current is supplied to the coil so that a magnetic field is applied that has an intensity approximate to a lower limit of a magnetic field intensity required for recording. Further, when the shift amount of the objective lens 5 in the radial direction becomes large and thus a magnetic field is applied that has a magnetic field intensity decreased to such a degree as not to allow recording, an electric current to be applied to the coil is increased so as to correspond to a shift amount of the objective lens 5, thereby maintaining a constant magnetic field intensity. As a result, an optical disk recording/reproducing device that achieves a reduction in power consumption can be obtained.

(Embodiment 2)

Figure 7:
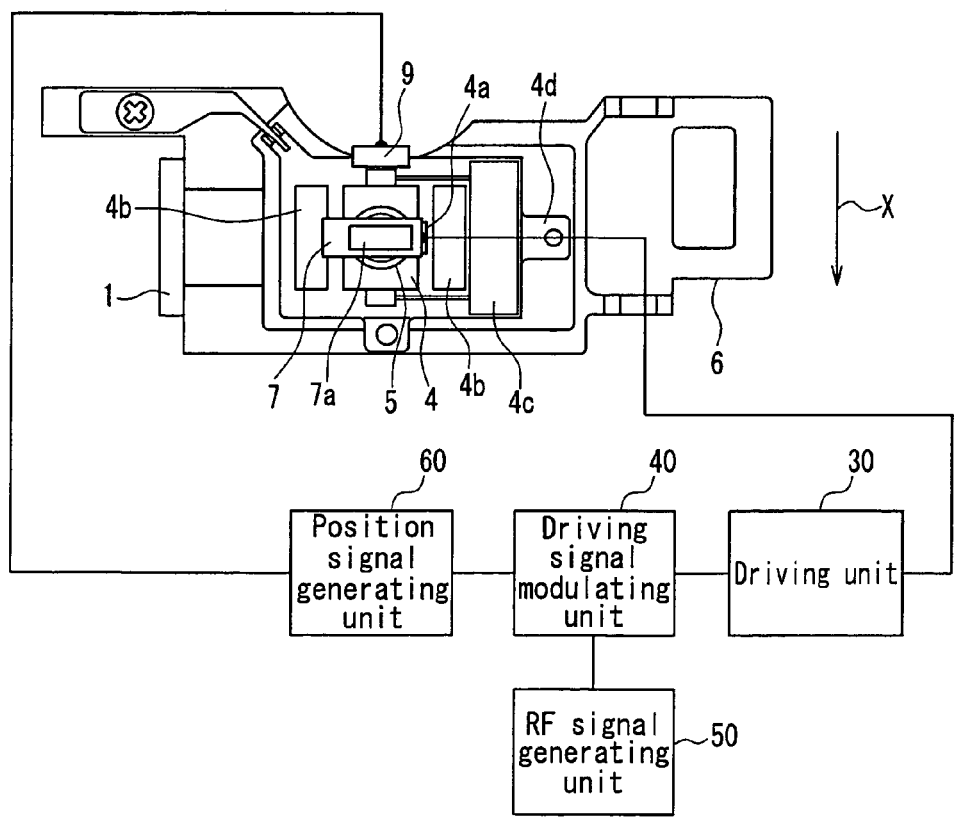
FIG. 7 is a plan view of an optical head and a magnetic head in an optical disk recording/reproducing device according to Embodiment 2 of the present invention.

The description is directed to the configuration and operation according to Embodiment 2 of the present invention with reference to FIG. 7. FIG. 7 is a plan view of an optical head and a magnetic head according to this embodiment. In FIG. 7, like reference characters indicate like members whose functions and operations are the same as those of the members shown in FIG. 14, for which detailed descriptions are omitted.

Reference character 9 denotes a reflective-type photointerruptor housing a light-emitting diode and a phototransistor. The photointerruptor 9 functions as a unit that detects a shift amount of an objective lens 5 in a tracking direction. The photointerruptor 9 is placed on an actuator base 4*d* that is a member on a fixed side of an objective lens actuator 4 so as to be opposed to a member on a movable side of the objective lens actuator, which holds the objective lens 5. When the objective lens 5 is shifted in the tracking direction by the objective lens actuator 4 so as to follow disk eccentricity or the like, based on an output signal of the photointerruptor 9, a position signal generating unit 60 generates a linear objective lens position signal that is in proportion to a shift amount of the objective lens in the tracking direction, which is shown in FIG. 2. Next, using the objective lens position signal thus obtained, in the same manner as in Embodiment 1, a driving signal modulating unit 40 at a next stage generates a modulation signal corresponding to a shift amount of the objective lens, and outputs a driving signal by performing a computation on the modulation signal using the signal generated by a RF signal generating unit 50. A driving unit 30 at a final stage amplifies the driving signal to drive a magnetic head 20.

As described above, according to this embodiment, when the shift amount of the objective lens 5 in a radial direction is small, an electric current is supplied to a coil so that a magnetic field is applied that has an intensity approximate to a lower limit of a magnetic field intensity required for recording. Further, when the shift amount of the objective lens 5 in the radial direction becomes large and thus a magnetic field is applied that has a magnetic field intensity decreased to such a degree as not to allow recording, an electric current to be applied to the coil is increased so as to correspond to a shift amount of the objective lens 5, thereby maintaining a constant magnetic field intensity. As a result, an optical disk recording/reproducing device that achieves a reduction in power consumption can be obtained.

Furthermore, the reflective-type photointerruptor 9 is used to detect a relative displacement between a movable part and a fixed part of the objective lens actuator, and thus can provide a simple and compact configuration of the unit that detects a shift amount of the objective lens in the tracking direction.

(Embodiment 3)

Figure 8:
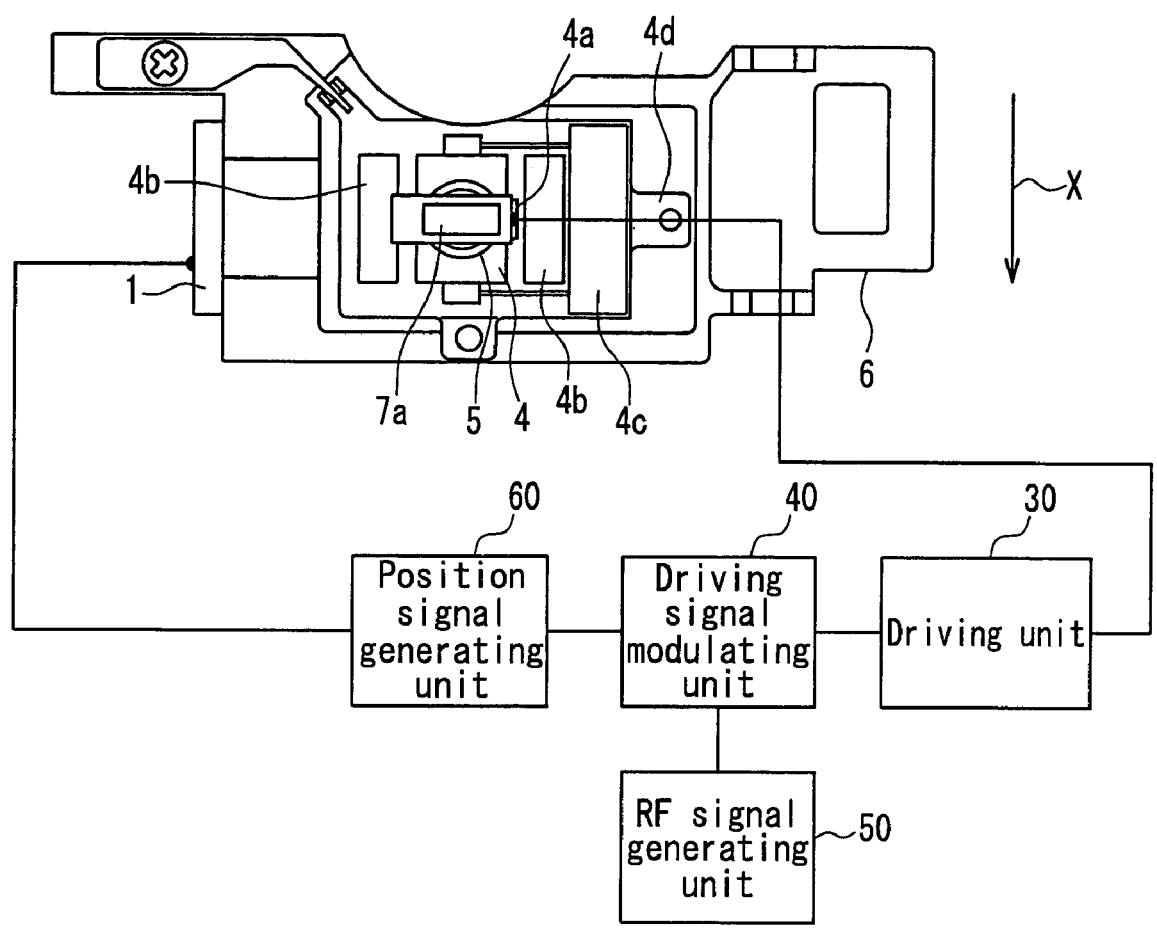
FIG. 8 is a plan view of an optical head and a magnetic head in an optical disk recording/reproducing device according to Embodiment 3 of the present invention.
Figure 9A:
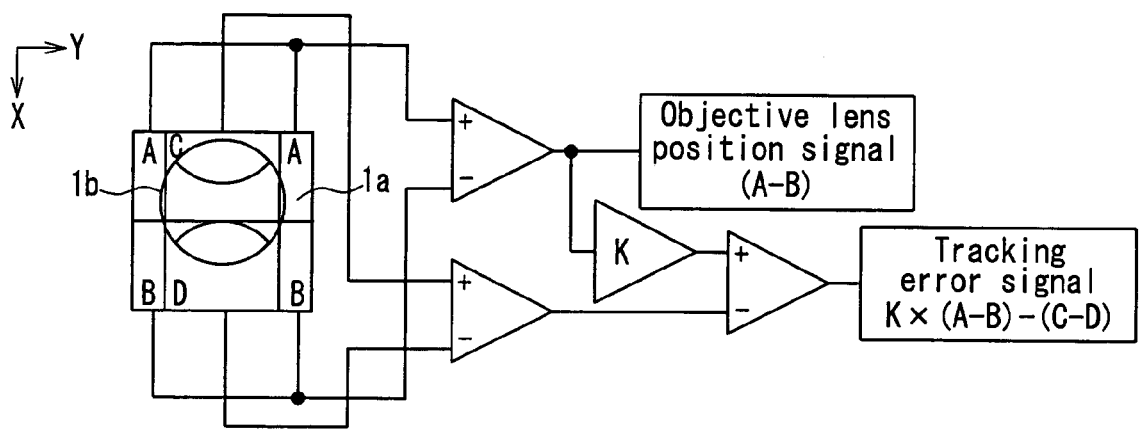
FIGS. 9A, 9B and 9C are block diagrams for showing the configuration of a photodetector in the optical disk recording/reproducing device according to Embodiment 3 of the present invention.
Figure 9B:
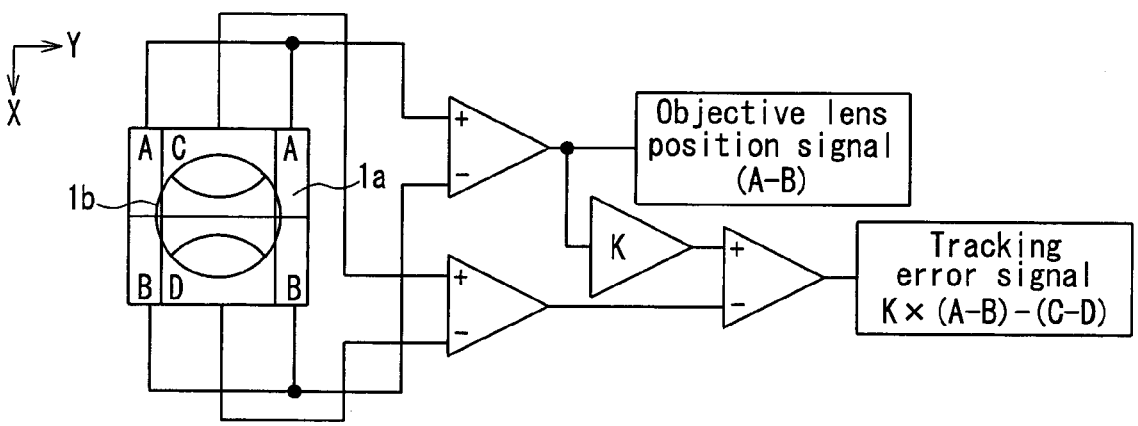
Figure 9C:
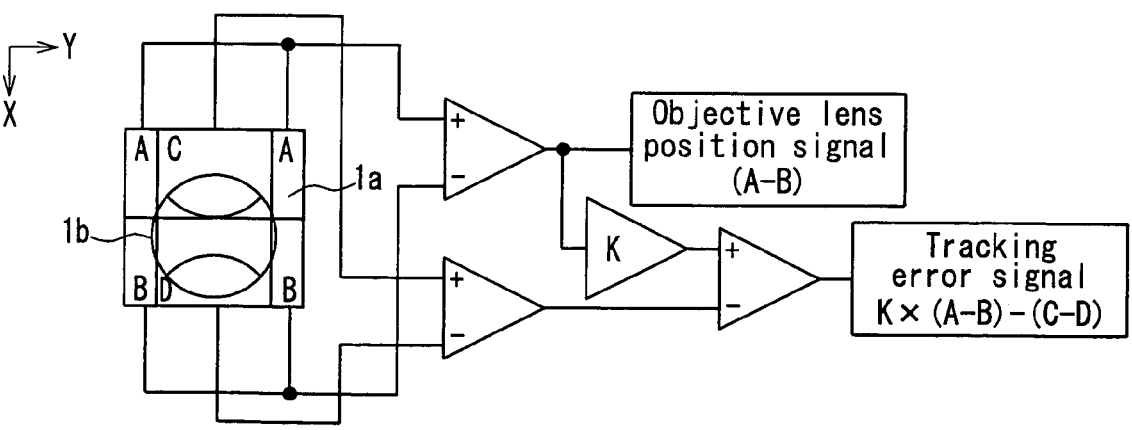

The description is directed to the configuration and operation according to Embodiment 3 of the present invention with reference to FIGS. 8, 9A, 9B and 9C. FIG. 8 is a plan view of an optical head and a magnetic head according to this embodiment. FIGS. 9A, 9B and 9C are schematic diagrams for showing a photodetector.

Figure 14A:
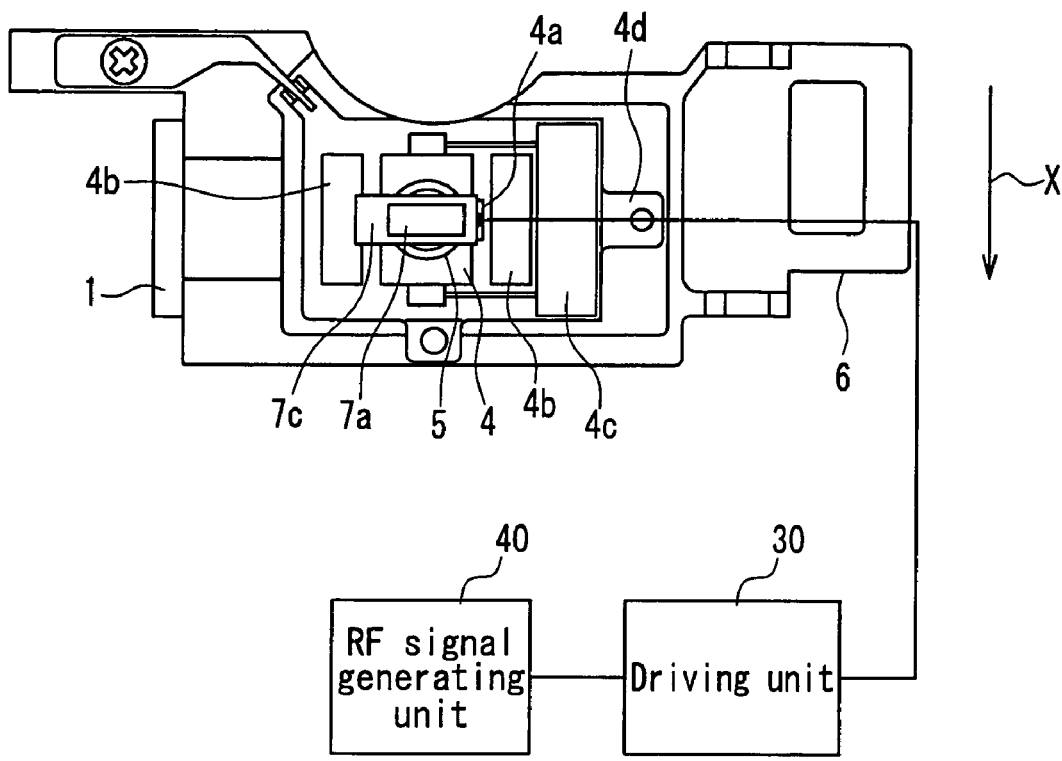
FIG. 14A is a plan view schematically showing the appearance of an optical head and a magnetic head of a conventional optical disk recording/reproducing device.
Figure 14B:
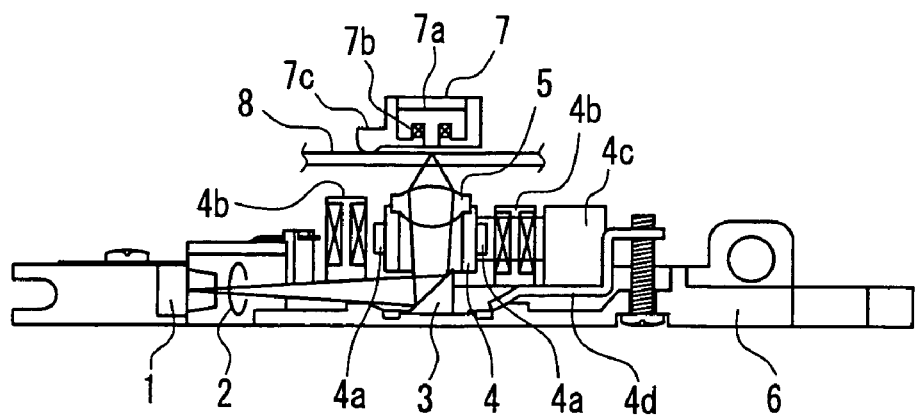
FIG. 14B is a side view of the appearance.

In FIGS. 8, 9A, 9B and 9C, like reference characters indicate like members whose functions and operations are the same as those of the members shown in FIG. 14, for which detailed descriptions are omitted.

This embodiment differs from Embodiment 2 having a configuration shown in FIG. 7 in that instead of using the photointerruptor 9 used in Embodiment 2, a light receiving/emitting element 1 is used as a unit (not shown) that detects a shift amount of an objective lens in a tracking direction.

In FIGS. 9A, 9B and 9C, reference character 1a denotes a photodetector that is housed in the light receiving/emitting element 1, reference characters A, B, C and D denote regions obtained by dividing the photodetector 1a, respectively, and reference character 1b denotes a beam spot in a far field of a light beam that has returned from a recording medium. The region A receives light incident on portions on both outer sides in an upper half of the photodetector 1a, the region B receives light incident on portions on both outer sides in a lower half of the photodetector 1a, the region C receives light incident on a portion in a center in the upper half of the photodetector 1a, and the region D receives light incident on a portion in a center in the lower half of the photodetector 1a. Each of the regions A, B, C and D outputs a signal corresponding to an intensity of the light thus received. Reference characters X and Y correspond to a radial direction of the recording medium and a tangential direction of the recording tracks of the recording medium, respectively.

The description is directed next to an operation of the photodetector 1a. Among several methods for detecting a shift amount of the objective lens in the radial direction based on returning light from the recording medium, an APP (Advanced Push-pull) method will be described herein. In each of FIGS. 9A, 9B and 9C, the beam spot 1b in the far field of a light beam that has returned from the recording medium is focused on the photodetector 1a. FIG. 9B shows a state where the shift amount of an objective lens 5 in the radial direction is 0. When the objective lens 5 is shifted in the radial direction, the beam spot 1b is shifted in the X direction as shown in each of FIGS. 9A and 9C. The regions A and B on the photodetector 1a are not affected by diffraction caused by grooves of the recording medium, and thus by determining a differential (A−B) of output signals of the regions A and B, a linear objective lens position signal similar to that represented by FIG. 2 can be obtained.

Furthermore, by determining a differential between an objective lens position signal (A−B) and a push-pull signal (C−D), a tracking error signal (K*(A−B)−(C−D), wherein K is a constant) can be obtained.

Using the objective lens position signal thus obtained, in the same manner as in Embodiment 1, a driving signal modulating unit 40 at a next stage generates a modulation signal corresponding to a shift amount of the objective lens, and outputs a driving signal by performing a computation on the modulation signal using s signal generated by a RF signal generating unit 50. A driving unit 30 at a final stage amplifies the driving signal to drive a magnetic head 20.

As described above, according to this embodiment, when the shift amount of the objective lens 5 in the radial direction is small, an electric current is supplied to a coil so that a magnetic field is applied that has an intensity approximate to a lower limit of a magnetic field intensity required for recording. Further, when the shift amount of the objective lens 5 in the radial direction becomes large and thus a magnetic field is applied that has a magnetic field intensity decreased to such a degree as not to allow recording, an electric current to be applied to the coil is increased so as to correspond to a shift amount of the objective lens 5, thereby maintaining a constant magnetic field intensity. As a result, an optical disk recording/reproducing device that achieves a reduction in power consumption can be obtained.

Moreover, the light receiving/emitting element 1 is used as the unit that detects a shift amount of the objective lens in the tracking direction, and thus in a process of obtaining a servo signal of the optical head, an objective lens position signal can be generated. This eliminates the need for providing another device or circuit for detecting a shift amount of the objective lens in the tracking direction, thereby incurring no increase in size and manufacturing cost of a device.

In this embodiment, the APP method was described as a detecting method. However, needless to say, other methods also may be used as long as they can achieve the same detection.

(Embodiment 4)

Figure 10B:
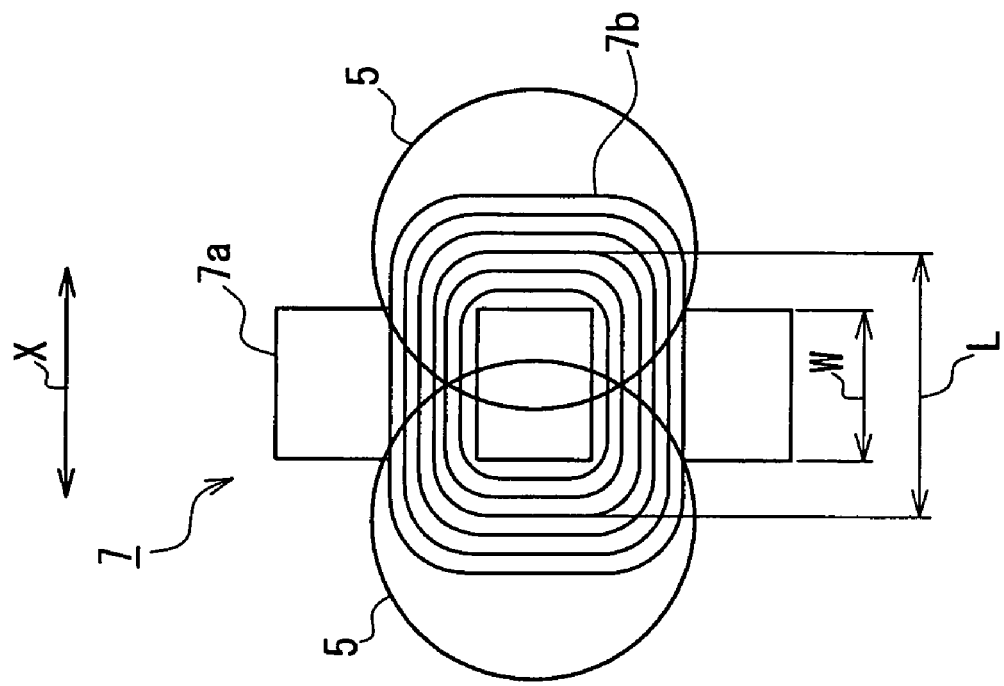
FIG. 10B is a front view of the magnetic head.
Figure 10A:
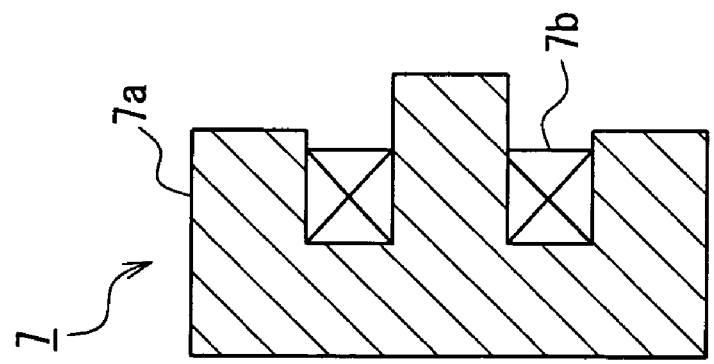
FIG. 10A is a sectional side view of a magnetic head in an optical disk recording/reproducing device according to Embodiment 4 of the present invention.
Figure 11:
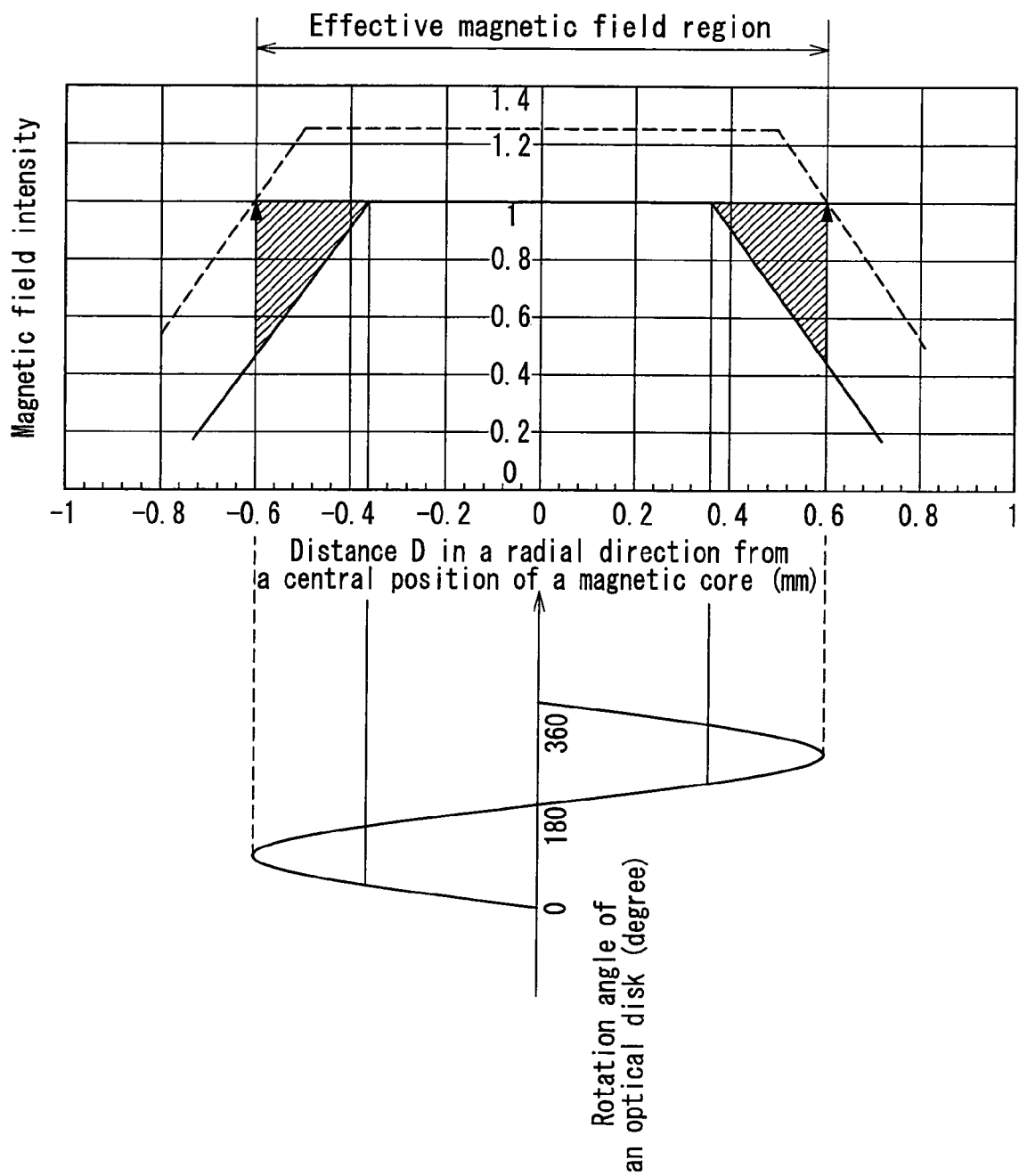
FIG. 11 is a diagram showing a distribution of an intensity of a magnetic field generated by the magnetic head in the optical disk recording/reproducing device according to Embodiment 4 of the present invention.
Figure 12:
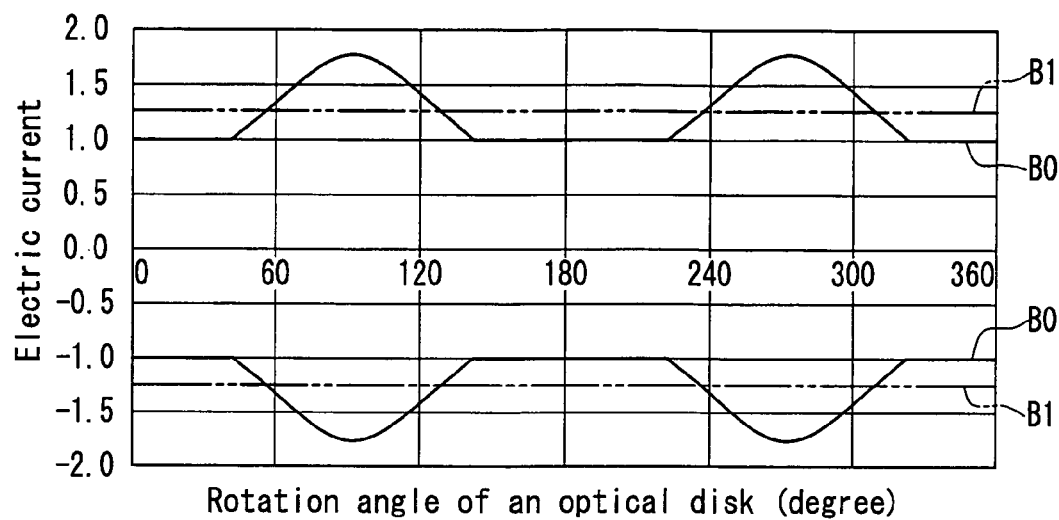
FIG. 12 is a diagram showing an example of a peak waveform of a driving current for the magnetic head in the optical disk recording/reproducing device according to Embodiment 4 of the present invention.
Figure 13:
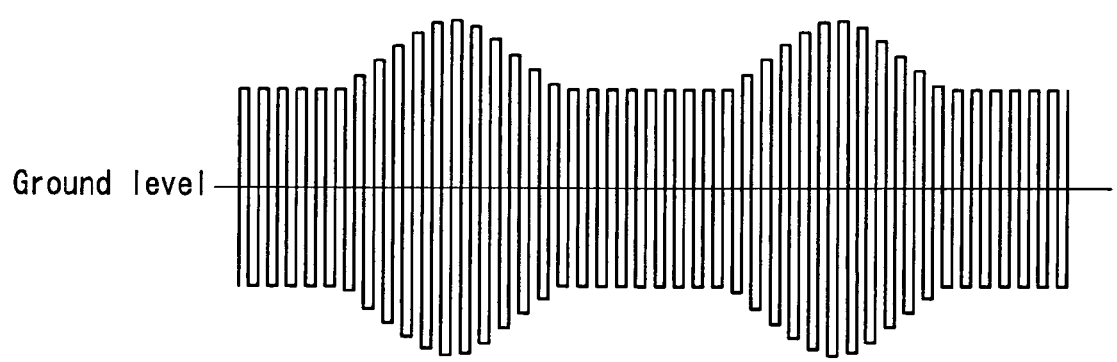
FIG. 13 is a diagram showing an example of a pulse waveform of a driving current for the magnetic head in the optical disk recording/reproducing device according to Embodiment 4 of the present invention.

The following description is directed to the configuration and operation according to Embodiment 4 of the present invention with reference to FIGS. 10A, 10B, 11 and 12. FIGS. 10A and 10B are a sectional side view and a front view of a magnetic head, respectively. In FIG. 10B, the dimension of the magnetic core is shown along with a shift amount of an objective lens. FIG. 11 is a diagram showing the distribution of a magnetic field intensity in a radial direction, FIG. 12 is a diagram showing a driving current peak waveform, and FIG. 13 is a diagram showing a driving current pulse waveform. In each of FIGS. 10A and 10B, like reference characters indicate like members whose functions and operations are the same as those of the members shown in FIG. 14, for which detailed descriptions are omitted.

In this embodiment, as shown in FIG. 10, a dimension W of a magnetic core 7a in a radial direction X is smaller than an assumed maximum shift amount L of an objective lens 5 in a tracking direction. When the objective lens 5 of an optical head follows disk eccentricity or the like and thus is shifted in the tracking direction under this condition, based on a signal obtained from a shift amount detecting unit 15 of an optical head 10, a position signal generating unit 60 generates an objective lens position signal shown in FIG. 2. The objective lens position signal is in proportion to a position of the objective lens in the radial direction. Next, using this objective lens position signal, a driving signal modulating unit 40 at a next stage generates a modulation signal corresponding to a shift amount of the objective lens, and outputs a driving signal by performing a computation on the modulation signal using a signal generated by a RF signal generating unit 50. A driving unit 30 at a final stage amplifies the driving signal to drive a magnetic head 20.

The following description is directed to an operation in the driving signal modulating unit 40. The driving signal modulating unit 40 generates a modulation signal based on the above-mentioned objective lens position signal and a distribution of a magnetic field intensity of the magnetic head.

This process will be described herein by referring to FIGS. 11 and 12. In FIG. 11, the horizontal axis indicates a distance D in the radial direction from a central position of the magnetic core, and the vertical axis indicates a magnetic field intensity expressed as a unitless value relative to the magnetic field intensity required for recording.

In the figure, the dotted line shows the distribution of a magnetic field intensity of a magnetic head according to the conventional technique as an example, which is the same as that shown in each of FIGS. 3 and 15. In an area defined by a distance of ±0.5 mm for the distance D in the radial direction, a magnetic field intensity of 1.25 is obtained. When an absolute value of the distance D in the radial direction becomes higher than 0.5 mm, the magnetic field intensity decreases. The area (±0.5 mm) in which a magnetic field intensity of 1.25 is obtained corresponds to the dimension W (1 mm) of the magnetic core 7a in the radial direction. In this conventional example, an effective magnetic field region is set to be an area defined by a distance of ±0.6 mm in the radial direction from the central position of the magnetic core. An electric current is applied to a coil so that a magnetic field intensity of not lower than 1 always can be obtained within this area.

In this embodiment, a reduction in a driving current is achieved by using a driving current having a current value 20% lower with respect to that in the case of the conventional example, namely, by allowing the maximum magnetic field intensity to be decreased from 1.25 that is a value obtained in the case of the conventional example to 1. Moreover, a decrease in the inductance of the coil is achieved by decreasing the dimension W of the magnetic core to 0.7 mm with respect to a value of 1 mm of the dimension W used in the case of the conventional example. In this case, the magnetic field intensity has a distribution shown by a solid line in FIG. 11. In an area defined by a distance of ±0.35 mm for the distance D in the radial direction, a magnetic field intensity of 1 is obtained. When the absolute value of the distance D in the radial direction becomes higher than 0.35 mm, the magnetic field intensity decreases.

A diagram shown below in FIG. 11 shows the shift amount of the objective lens in the radial direction with respect to the central position of the magnetic core when an optical disk having an amount of eccentricity of 0.6 mm is followed by the objective lens. Only when the shift amount of the objective lens in the radial direction with respect to the central position of the magnetic core has an absolute value higher than 0.35 mm, recording cannot be performed due to an insufficient magnetic field intensity.

Thus, in this embodiment, the following process is performed. That is, a shift amount of the objective lens in the radial direction is detected. When the shift amount has a value beyond a range of ±0.35 with respect to the central position of the magnetic core, the percentage decrease of a magnetic field intensity corresponding to the shift amount is determined based on the distribution of a magnetic field intensity shown by the solid line in FIG. 11. Then, an electric current modulated (amplified) by a reciprocal of this percentage decrease is applied to the coil. As a result, even when the objective lens is shifted a distance in a range more than 0.35 mm and not more than 0.6 mm in the radial direction from the central position of the magnetic core, a magnetic field intensity of 1 always can be obtained, thereby allowing recording to be performed.

FIG. 12 shows a peak waveform of a driving current to be applied to the coil in the case where recording is performed with respect to an optical disk having an amount of disk eccentricity of 0.6 mm (0–peak). In the figure, a horizontal axis indicates a rotation angle of the optical disk, and a vertical axis indicates a current value. When using an electric current having a value of "1", a magnetic field having a magnetic field intensity of "1" shown in FIG. 11 is applied. In FIG. 12, a solid line B0 shows a peak waveform (peak-to-peak value) of a driving current used in this embodiment. When the objective lens follows eccentricity of the optical disk and thus is displaced so as to have a shift amount in a range of ±0.35 mm, an electric current having a current value of 1 is used. However, when the shift amount has an absolute value higher than 0.35 mm, an electric current is used in an increased amount. When the shift amount reaches a value having an absolute value of 0.6 mm, an electric current having a current value of 1.75 is used. After the shift amount has reached the value having the absolute value of 0.6 mm, an electric current is used in an amount that decreases back to a current value of 1. For every one rotation of the optical disk, two current peaks occur.

This waveform is multiplied by a signal obtained by the RF signal generating unit 50, and thus an actual driving current pulse waveform shown in FIG. 13 is obtained.

In FIG. 12, a chain double-dashed line B1 shows an average value of a driving current modulation waveform B0, and has a current value of 1.25. This value is equivalent to a current value of a driving current used in the case of the conventional example.

As described above, according to this embodiment, when the shift amount of the objective lens 5 in the radial direction is small, an electric current is supplied to the coil so that a magnetic field is applied that has an intensity approximate to a lower limit of a magnetic field intensity required for recording. Further, when the shift amount of the objective lens 5 in the radial direction becomes large and thus a magnetic field is applied that has a magnetic field intensity decreased to such a degree as not to allow recording, an electric current to be applied to the coil is increased so as to correspond to a shift amount of the objective lens 5, thereby maintaining a constant magnetic field intensity. As a result, even in the case of using a magnetic core having a small width, a magnetic head can be driven with a driving current of the same level as in the case of the conventional example. Therefore, a magnetic core and a coil can be reduced in size, and thus an optical disk recording/reproducing device having an excellent high-frequency property can be obtained.

The embodiments disclosed in this application are intended to illustrate the technical aspects of the invention and not to limit the invention thereto. The invention may be embodied in other forms without departing from the spirit and the scope of the invention as indicated by the appended claims and is to be broadly construed.

The invention claimed is:

1. An optical disk recording/reproducing device, comprising:
   a magnetic head that performs magnetic field modulation;
   an objective lens for focusing light on a recording medium;
   an objective lens actuator that allows the objective lens to perform a following operation in a focusing direction and a tracking direction;
   a shift amount detecting unit that detects a shift amount of the objective lens in the tracking direction;
   a position signal generating unit that generates a position signal corresponding to a position of the objective lens based on an output signal from the shift amount detecting unit; and
   a driving signal modulating unit that modulates a driving current for the magnetic head so as to correspond to the position signal.

2. The optical disk recording/reproducing device according to claim 1,
   wherein the driving signal modulating unit modulates a driving current for the magnetic head in a stepwise manner.

3. The optical disk recording/reproducing device according to claim 1,
wherein the shift amount detecting unit detects a shift amount of the objective lens in the tracking direction by detecting a relative displacement between a movable part and a fixed part of the objective lens actuator.

4. The optical disk recording/reproducing device according to claim 1,
wherein the shift amount detecting unit detects a shift amount of the objective lens in the tracking direction based on reflected light from the recording medium.

5. The optical disk recording/reproducing device according to claim 1,
wherein a magnetic core of the magnetic head has a dimension in the tracking direction that is smaller than a shift amount of the objective lens in the tracking direction.

6. The optical disk recording/reproducing device according to claim 1,
wherein an absolute value of a driving current for the magnetic head has a set upper limit value.

* * * * *